UNITED STATES PATENT OFFICE.

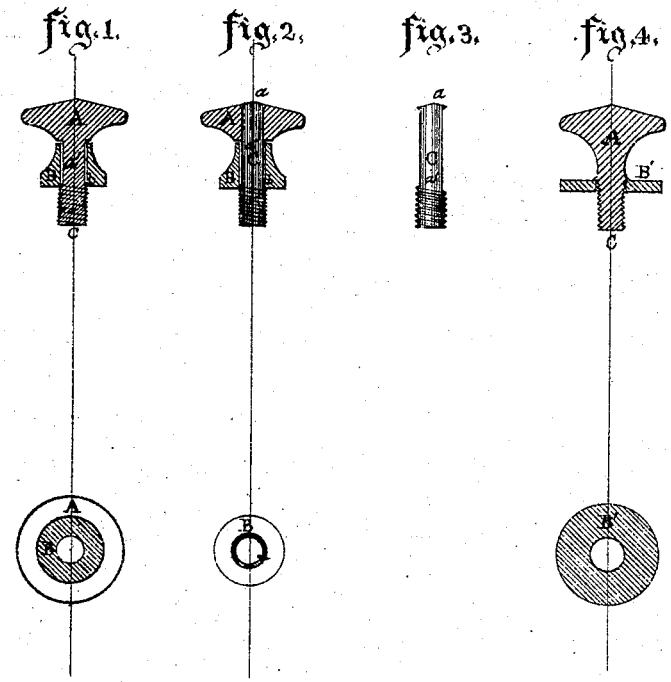

ELIHU WILDER, OF SPRINGFIELD, MASSACHUSETTS.

IMPROVEMENT IN SET-SCREWS FOR SEWING-MACHINE ATTACHMENTS.

Specification forming part of Letters Patent No. 117,357, dated July 25, 1871.

*To all whom it may concern:*

Be it known that I, ELIHU WILDER, of Springfield, county of Hampden and State of Massachusetts, have invented a new and useful Improvement in Thumb-Screws for the Gauge, &c., attached to Sewing-Machines; and I do hereby declare that the following is a full, clear, and exact description thereof, which will enable others skilled in the art to make and use the same, reference being had to the accompanying drawing forming part of this specification, in which—

Figure 1 is a vertical section and end view. Fig. 2 is a vertical section and end view of a modification of the device. Fig. 3 is a view of the screw of Fig. 2. Fig. 4 is a section of the old style of screw and a separate washer.

My invention has for its object to furnish for the gauges of sewing-machines or similar purposes a thumb-screw and washer combined, so that where the latter becomes necessary, from the small bearing of the stock of the screw, the washer will be removed when the screw shall be lifted, thereby avoiding the necessity of using another hand or the same hand twice. The nature of this invention consists in making the shank of the screw near the head smaller than the lower part and without threads, so that the washer when placed thereon, by means hereafter to be described, will not drop off, and yet can, when so desired, be taken off without difficulty; all of which will be hereinafter more fully described.

A is the stock of the thumb-screw; B, the washer, having at the bottom, at *b*, one or more threads; C, the stem or shank of the screw. B' is a separate washer, as used now on sewing-machines, or elsewhere, when required. *a* is the rivet-head; *a'*, the neck; and *b*, the thread in B. In making the thumb-screw various methods may be employed.

The upper part of the shank C may be turned or filed off small enough for the hole in the fixed washer B, so that it will turn easily thereon, the washer having a single thread or more at the lower side to engage, when requisite, in the thread of the screw. The thread of the screw can then be cut on the shank after the washer is in place, which, of course, will raise the thread and thus prevent the washer from dropping off. The thread on the washer can at any time be made to engage the screw-thread by being reversed, and thus be removed, if desirable. Another method is shown in Figs. 2 and 3, where the screw-shank can be inserted into the head A through a suitable hole and then riveted on top, as at *a*. Another method will be to make the hole in washer B of such a size that when the washer shall have been expanded by heat it will pass over the screw-threads and shrink to its normal condition over the neck at *a'* when cooled, and thus be retained by the thread, as in other cases mentioned. The old method of applying the thumb-screw, as shown at Fig. 4, where a separate washer is used, requires the use of two hands or the same hand twice. In my invention the removal of the one carries the washer with it also.

Having fully explained and described my invention, what I claim as new therein, and desire to secure by Letters Patent of the United States, is—

The thumb-screw A provided with the screw-shank C having a neck, *a'*, and the washer B, constructed substantially as and for the purpose described.

ELIHU WILDER.

Witnesses:
C. D. JULAN,
W. R. SINGLETON.